March 22, 1938.　　　　E. A. HULTS　　　　2,111,783
PRODUCTION OF CARBON DIOXIDE
Filed July 10, 1934
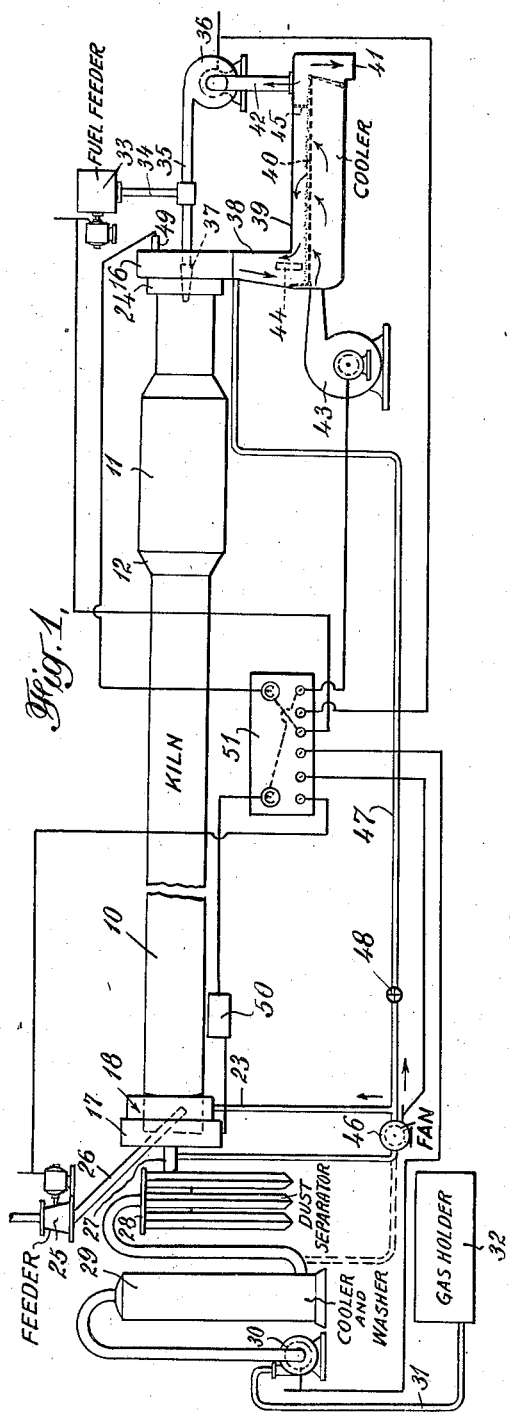
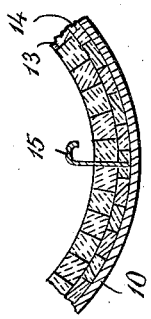
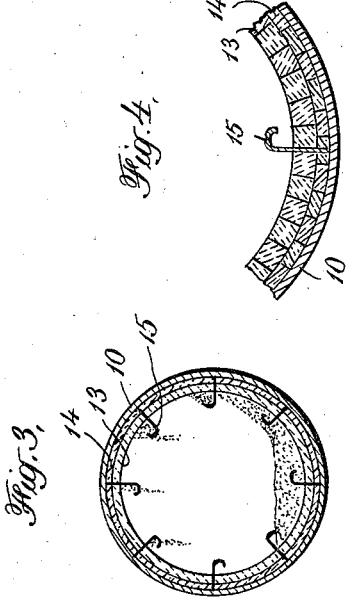
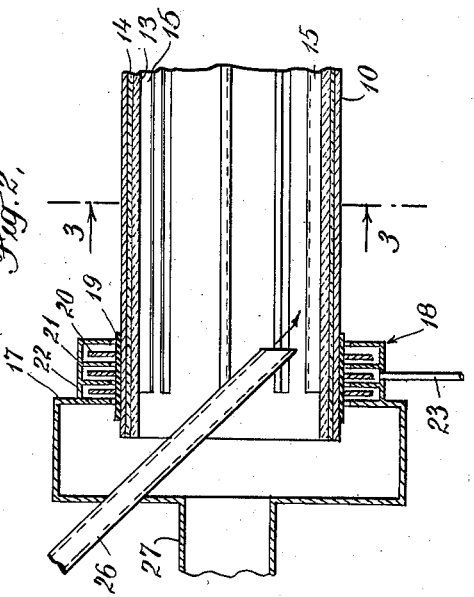
INVENTOR
Eugene A. Hults
BY
ATTORNEYS Patented Mar. 22, 1938

2,111,783

UNITED STATES PATENT OFFICE 2,111,783

PRODUCTION OF CARBON DIOXIDE

Eugene A. Hults, Saltville, Va., assignor to The Mathieson Alkali Works, Inc., New York, N. Y., a corporation of Virginia Application July 10, 1934, Serial No. 734,522

11 Claims. (Cl. 23—150)

This invention relates to the production of carbon dioxide gas and is concerned more particularly with a novel method and apparatus by which carbon dioxide gas having a high $CO_2$ content can be produced from natural carbonates.

Carbon dioxide gas is an important raw material in the manufacture of various products, such as sodium bicarbonate and solid carbon dioxide, and for most purposes, it is desirable that the gas should be of as high a strength in $CO_2$ as possible, that is, that the partial pressure of the $CO_2$ should approach 100% as closely as may be. The most plentiful source of carbon dioxide is the natural carbonates, such as limestone, dolomite, magnesite, oyster shells, etc. and heretofore carbon dioxide has been most commonly produced by burning natural carbonates in vertical shaft kilns. In these kilns, the raw material and coke are charged into the top of the shaft and air for combustion is blown in at the bottom. The products of combustion are then taken off at the top of the shaft close to the point of admission of the charge and the solid material is discharged at the bottom of the shaft adjacent the point of air admission.

Vertical shaft kilns, when properly designed and operated, are of high thermal efficiency, and when air is used for combustion, limestone may be burned in such kilns with the production of gas containing from 40% to 43% $CO_2$. Under similar conditions, gas containing from 45% to 48% $CO_2$ may be produced from dolomite, and gas containing from 50% to 55% may be produced from magnesite. When the air supplied to the kiln is enriched with oxygen, the results obtained may be substantially improved, but they are obtainable in any case only when the proper fuel is used and the raw materials employed are carefully selected as to size and certain other physical characteristics. Because of these requirements as to the raw materials to be used, there are certain low cost materials that cannot be burned in vertical kilns with the production of gas high in $CO_2$.

In operating a vertical shaft kiln to produce gas high in $CO_2$, coke must be employed as the fuel and it must be intimately mixed with the raw material being charged. Proper burning of the coke requires that the combustion gas have a free passage through the entire mass and free flow of air with good distribution through the mass can be obtained only by employing raw material, for example, limestone, which has been properly and uniformly sized. In addition to that, the stone must have sufficient strength as to bear the burden to which it is subjected in the kiln without crushing and similarly, the coke used in such an operation must be of proper size and strength to bear the weight of the material above it without being crushed.

In the quarrying of limestone, dolomite etc., fragments varying greatly in size are produced and the large fragments must be reduced for subsequent operations. The whole process of quarrying and crushing leads to the production of a large percentage of stone of too small a size to be burned in a shaft kiln with the production of high test $CO_2$. Consequently, an important part of the quarry output is useless for the production of that gas, and the cost of production of high test $CO_2$ in a shaft kiln is high because of quarry depletion and loss.

Regardless of fragment size, there are certain materials which cannot be burned in a shaft kiln with the production of high test $CO_2$. These materials include stones which are so soft that they become crushed in the kiln with resultant stoppage of air flow, and small oyster shells which tend to nest together in the kiln and form a mass with few interstices through which the air can penetrate. Accordingly, soft carbonates, small sized materials, and small shells have heretofore ordinarily been burned primarily for recovery of their lime content and with incidental production of low grade $CO_2$ gas.

Horizontal rotary kilns can be used for the burning of carbonates, such as limestone and oyster shells, and the operation of these kilns involves no difficulties arising from the size of the fragments or the softness or shape of the material. However, as heretofore constructed and operated, rotary kilns have not lent themselves to the production of gas of high $CO_2$ content and the gas produced with air used for combustion has not exceeded 30% of $CO_2$ and usually has a lower content.

The present invention is accordingly directed to the provision of a novel method and apparatus which afford certain of the advantages of both rotary and vertical shaft kilns while avoiding their disadvantages. Thus, apparatus constructed and operated in accordance with the principles of the invention is superior to ordinary rotary kilns in that it can produce gas of higher $CO_2$ content from the same low cost raw materials, and it is superior to ordinary shaft kilns in that it can produce from such materials gas of a $CO_2$ content approaching that which can be made in a shaft kiln only by the use of superior raw materials of selected physical characteristics, such as fragment shape, size, etc., and fuel of the proper type.

In order that the desired results may be obtained, the burning of the raw materials must be carried on at a high thermal efficiency, and this requires that the heat losses such as through the stack, by radiation, etc. be kept as small as possible. The chief heat loss in an operation of this sort is stack loss and this can be kept low by proper heat interchange between the exit gas and the raw material feed, by supplying air for combustion of the fuel in an amount as closely approximating the theoretical amount required as possible, and by keeping the ratio of fuel consumed to raw material fed as low as possible. The amount of fuel that must be consumed in the operation depends to some extent on the heat loss in the product and the heat loss by radiation, convection, etc. The greater these latter heat losses are, the greater will be the amount of fuel that must be consumed and the amount of air that must be supplied to burn the fuel, and the greater will be the stack loss. It is, therefore, necessary in order to obtain the high thermal efficiency essential to the production of gas containing a high proportion of $CO_2$ that heat be taken from the product discharging and from the exit gas and returned to the operation, that a close control of combustion conditions be maintained, and that heat loss by radiation be kept as low as possible.

The apparatus of this invention is accordingly constructed with these objects in view and includes features by which the close and accurate control of combustion conditions that is carried on in the practice of the method required may be exercised.

The new apparatus includes a rotary kiln which is provided with a lining of insulating material additional to the usual brick lining and preferably extending from end to end of the kiln, although considerations of economy in maintenance may prevent the use of the insulation in the hot zone. The use of the insulating lining reduces the loss of heat by radiation and that loss is further reduced by reason of the kiln having a section of increased diameter throughout the length of the hot zone, this larger section of the kiln being connected to the remainder thereof by inclined walls which tend to reflect radiant heat and prevent it from traveling lengthwise of the kiln.

The exit gas leaves the kiln at a low temperature, the heat being transferred therefrom to the raw material which is fed to the kiln by a feed capable of close control. The desired heat transfer can be obtained either by making the kiln of great length or by using the exit gas to preheat the raw material feed. I prefer to employ a kiln of great length, such for example, as 360 feet overall, and by providing lifts at the gas exit end of a kiln of this length, the heat interchange between the gases flowing through the kiln to the exit and the raw material traveling toward the hot zone is such that preheating of the feed in a separate operation may be eliminated without substantially impairing the efficiency.

In order that the fuel may be burned with an air supply as closely approximating the theoretical amount of air required as possible, the apparatus is provided with means for exercising exact control of the rates of feed of the raw material, the fuel, and the total air for combustion, and of the relative proportions of primary and secondary air in the total air supply. I use as a fuel a material high in pure carbon content, such as petroleum coke, and this material is fed in pulverized condition by a suitable feeder capable of regulation. The pulverized fuel is mixed with primary air and delivered to a burner which discharges the mixture into the kiln, the secondary air being supplied to the kiln adjacent the burner. Both the primary and secondary air are preheated by contact with the discharging product and they are supplied by separate means so that the desired control of the total air supply and of the relative proportions of primary and secondary air may be exercised. The controllable feeder for the fuel makes it possible to supply fuel at the rate required by the rate of feed of the raw material and the control of the total air supply and of the relative amounts of primary and secondary air permits the maintenance of a flame of the proper length and the supplying of the total air at a rate closely approximating the theoretical rate.

In order to prevent admission of air into the kiln except under control, the kiln is provided with a seal at the gas exit end and if desired also at the firing end. The seal at the gas exit end of the kiln prevents ingress of air at this place and one form of seal that may be used for the purpose is supplied with a small amount of the evolved gas which escapes through the seal to the atmosphere. The evolved gas is drawn from the kiln by a blower and passed through a dust separator and a washer and cooler, and by proper adjustment of the blower, the pressure at the firing end of the kiln may be maintained at approximately atmospheric so that entrance of air into the kiln at the firing end can be prevented, even though no seal is provided at that place. The gas issuing from the blower is ready for delivery to storage, although a part of the gas may be delivered to the seal and another part used for recirculation.

By the use of the new method and apparatus of the invention, a gas may be produced containing up to 38% $CO_2$ using oyster shells as the raw material, petroleum coke as the fuel, and air for combustion. Improved results as to $CO_2$ content can be obtained by enriching the air for combustion with oxygen. When oxygen is thus used, it may be necessary to use a proportion of the exit gas to control combustion conditions, the gas being withdrawn from the discharge line from the kiln either in front of or behind the dust separator and mingled with the air supply beyond the preheater.

The extent of the improvement in the results obtained by the use of oxygen in the apparatus of the invention depends upon the manner in which the oxygen is used. For example, by using oxygen to enrich the air and employing producer gas as a fuel, it is possible to obtain a gaseous product containing up to 47% $CO_2$ and the $CO_2$ content may be as high as 95% to 98% when petroleum coke is burned with oxygen. The oxygen may also be employed in the manufacture of producer gas of high B. t. u. value which can then be used as fuel in the apparatus. When such a high value producer gas is burned in the apparatus with air, the $CO_2$ results may approximate 50% and when this producer gas is burned in the kiln with oxygen, the $CO_2$ results may run as high as 95% to 98%.

For a better understanding of the invention, reference may be had to the accompanying drawing, in which—

Figure 1 is a diagrammatic view of the complete apparatus with certain of the parts shown conventionally;

Figure 2 is a longitudinal sectional view through a portion of the apparatus at the gas discharge end of the kiln;

Figure 3 is a sectional view on the line 3—3 of Figure 2, and

Figure 4 is an enlarged fragmentary sectional view similar to Figure 3.

Referring now to the drawing, the apparatus is illustrated as including a horizontal rotary kiln 10 which includes a steel shell of generally cylindrical form, but having a section 11 of increased diameter extending throughout the hot zone, the section 11 being connected to the remainder of the kiln by inclined walls 12. The kiln is provided with the customary lining 13 of firebrick and a lining 14 of insulating material interposed between the firebrick and the shell. For best results in operation, the insulating lining 14 should extend from end to end of the kiln but considerations of economy in maintenance may require the elimination of the insulating lining from the section 11.

The use of the section of enlarged diameter extending throughout the hot zone or decomposition zone of the kiln results in a reduction in the radiation from the surface of this portion of the kiln. Also, since there is a greater mass of solids per unit length in the decomposition zone than would be the case if this portion of the kiln were of the same diameter as the remainder, there is a greater turnover of the particles and the heat absorption by the particles takes place at a more rapid rate. The inclined surface 12 at the ends of the decomposition zone have a tendency to reflect radiant heat back into the zone and thus serve to prevent it from traveling lengthwise of the kiln.

The kiln is made of great length in order that the temperature of the gases leaving the kiln may be lowered by a proper interchange of heat between the gases and the raw materials being fed and advancing through the kiln. For example, the kiln may be 360 feet long overall with an outside diameter of 8 feet increasing to 13 feet in the section enclosing the decomposition zone, this section being 27 feet long. To increase the rate of heat interchange between the raw material feed and the gases, lifts 15 may be mounted in the kiln adjacent the gas discharge end, these lifts extending along the kiln for a distance of 40 feet, for example. Such lifts serve to pick up the raw material and drop it through the gases, thus insuring thorough exposure of the material to the gases.

The kiln is provided at opposite ends with hoods 16 and 17 and at the hood 17 there is a seal 18, shown more clearly in Fig. 2. This seal comprises a band 19 mounted circumferentially on the kiln and provided with spaced flanges 20 arranged in alternation with flanges 21 on a ring 22 attached to the hood 17, the spacing between the adjacent flanges being slightly greater than the amount of expansion of the kiln. A portion of the evolved gases is supplied to the seal by the pipe 23 and the gases fill the spaces between the flanges and escape to the atmosphere, thus preventing ingress of air into the kiln.

At the hood 16, a similar seal 24 may be provided but by proper regulation of devices presently to be described, the pressure within the kiln at the hood 16 may be maintained substantially at atmospheric pressure, in which event there is no tendency for atmospheric air to enter the kiln and no seal is needed.

The raw material is fed into the kiln by a feeder 25 of conventional construction and operating to feed the material at a rate which can be closely controlled. The material fed by the feeder passes through the pipe 26 extending through the hood 17 and is discharged into the end of the kiln which lies within the hood. The evolved gases leave the hood 17 through the conduit 27 and are drawn through a dust separator 28 and a cooler and washer 29, both of standard construction, by a blower 30. The operation of this blower can be regulated and it is one of the means by which the pressure within the kiln is controlled. The gas leaving the blower passes through a conduit 31 to a gas holder 32.

When solid fuel is used, such as pulverized petroleum coke, this fuel is fed by a feeder 33 of conventional construction and of the type which permits an accurate control of the rate of feeding. The fuel passes from the feeder through a pipe 34 into a line 35 leading from a blower 36 to a burner 37 which enters the end of the kiln lying within the hood 16. The solids discharged from the kiln enter the hood 16 and pass downward through a conduit 38 to a cooler and heat exchanger 39. This cooler and heat exchanger includes a vibrating screen 40 on which the solids are deposited and along which they travel to the discharge end 41 of the cooler. The intake 42 of the blower 36 is connected to the top of the cooler near the end thereof at which the solids are discharged and the blower draws heated air from the cooler and delivers it to the burner.

The total amount of air supplied to the kiln is delivered to the cooler and heat exchanger 39 by the blower 43 and the secondary air for combustion passes through the hot material on the screen and enters conduit 38 at one side of baffle 44. A movable baffle 45 within the heat exchanger 39 determines the extent of contact of the primary air with the hot material and thus serves as a means for regulating the temperature to which the primary air is preheated, the amount of primary air supplied to the burner being controlled by blower 36.

When it is desired to recirculate a part of the evolved gases and employ such gases for controlling the temperature of combustion, as for example when the air for combustion is enriched with oxygen, gas is withdrawn by blower or fan 46 from pipe 27, either between hood 17 and dust separator 28 or between the dust separator and cooler and washer, and delivered through pipe 47 containing valve 48 to conduit 38. The pipe 47 also connects with pipe 23 so that fan 46 supplies gas to the seal 18.

In order that the apparatus may be operated so that the best results are obtained, the several operations of feeding the raw material, feeding the fuel, supplying air for combustion, etc., must be coordinated and controlled. To this end, the apparatus is provided with means, such as an optical pyrometer, conventionally illustrated at 49, for indicating the temperature of combustion in the hot zone, and means, such as a carbon monoxide recorder, shown conventionally at 50, for indicating whether or not a sufficient quantity of air is being supplied for complete combustion of the fuel. The two indicating means give their indications at a central station 51 and at this station are located the switches for controlling the motors driving the material feeders and the several blowers. A single operator at this station can accordingly control and coordinate the operation of the different elements of the apparatus so as to obtain the desired results with respect to the $CO_2$ content of the evolved gas. If desired, and as is indicated diagrammatically, the pyrometer may be connected so as to provide automatic control of the motor operating the fuel feeder, whereby the feed of fuel with relation to the feed of raw material is controlled by the temperature in the hot zone without intervention of the operator. Similarly, the carbon monoxide recorder may be connected so as to provide automatic control of the total air supply, the proportioning of the total air to the fuel fed being thus regulated in accordance with the gas analysis of the exit kiln gas.

In the operation of the equipment, the operator initially determines the volume of feed of raw material and adjusts the relative amounts of primary and secondary air manually to obtain a flame of the proper length. Ordinarily, the total air supply will consist of from 10% to 20% of primary and the remainder secondary air, and after the flame length has been adjusted, the relative amounts of fuel and total air being fed per unit of time and the volume of fuel being fed in relation to the volume of raw material may thereafter be controlled either manually or automatically.

With the equipment described, the gas leaving the kiln gives up heat to the raw material being fed to an extent such that the gas leaves the kiln at relatively low temperatures, such as 300°–350° C. or lower. The solid product gives up heat to the air for combustion and it is desirable to abstract as much heat as possible from the solid product. However, the temperature of the primary air cannot be raised too high because pre-ignition may result. Preferably, the primary air will be heated to a temperature between 150° C. and 200° C., the control of temperature of the primary air being effected by means of the baffle 45.

The $CO_2$ content of the gas produced in the apparatus may be substantially increased by employing oxygen to enrich the air supplied for combustion. When oxygen is used, it is necessary to dilute the air-oxygen mixture with recirculated gas so as to control the conditions of combustion. Ordinarily, the oxygen present in the mixture entering the kiln will be about 20% of the total, although it may vary from 10% up to 40%. The oxygen may be preheated if desired in any suitable manner, as for example, by being passed through the cooler and heat exchanger 39 in contact with the solids therein. When oxygen is used, a portion of the evolved gases may be recirculated to control combustion, these gases being passed through pipe 47 into the stream of hot secondary air entering the hood 16. Contact of a mixture of oxygen and recirculated gas with hot lime must be avoided as this might result in a partial reduction of the $CO_2$ present.

When oxygen is used in the manner described, the results obtained with respect to the $CO_2$ content of the gas produced depends on the proportion and purity of the oxygen employed, and it is possible to produce gas containing 98% or more of $CO_2$.

Instead of using the oxygen for supporting combustion of fuel, such as pulverized coke or ordinary producer gas, the oxygen may be employed in the production of a high test producer gas which may then be burned in the presence of air. Another method of employing oxygen involves its use in the production of a high test producer gas which is burned in the presence of oxygen. The results obtained with these different methods of firing depend on the character of the fuel and on the amount and purity of the oxygen used. In all instances, the new apparatus is so constructed that it can be operated to produce gas containing a higher proportion of $CO_2$ than is obtainable in an ordinary rotary kiln supplied with the same fuel and combustion supporting gas and operated in accordance with prior practice.

It is to be understood that the method and apparatus of my invention as defined in the claims herein are applicable to the production of carbon dioxide gas from various natural carbonates of the alkaline earth metals and magnesium, such for example as limestone, dolomite, oyster shells, magnesite, etc. Accordingly, in employing the term "carbonates" in the claims, I refer to carbonates of the alkaline earth metals and magnesium, and do not intend to refer to such metallic carbonates as those of lead and zinc, for example.

What I claim:

1. A method of producing and recovering gas containing $CO_2$ in a rotary kiln having an elevated feed end and a discharge end, which comprises delivering a carbonate into the kiln at the feed end thereof, introducing fuel into the discharge end of the kiln, discharging solids from the discharge end of the kiln, passing a combustion-supporting gas in heat-exchange relation to the solids discharged from the kiln while they still are hot, mixing a portion of the heated gas with fuel to be delivered to the kiln to act as a primary combustion-supporting gas, passing another portion of the heated gases to the kiln as a source of secondary gas for combustion, withdrawing evolved gases from the kiln at the feed end thereof, and passing a portion of the withdrawn evolved gases into the combustion supporting gas to regulate the temperature produced by the burning fuel.

2. A method of producing and recovering gas containing $CO_2$ in a rotary kiln having an elevated feed end and a discharge end, which comprises delivering a carbonate into the kiln at the feed end thereof, introducing fuel into the discharge end of the kiln, discharging solids from the discharge end of the kiln, passing combustion-supporting gas in heat exchange relation to the solids discharged from the kiln while they still are hot to take up heat therefrom, mixing a portion of said heated gases with fuel to be delivered to the kiln to act as a primary combustion-supporting gas, passing another portion of the heated gas to the kiln as a source of secondary air for combustion, regulating the amount of heat taken up by the primary and secondary combustion-gases so that the amount of heat taken up by the primary combustion-supporting gas varies inversely as the amount of heat taken up by the secondary combustion-supporting gas, and withdrawing evolved gases from the kiln at the feed end thereof.

3. A method of producing and recovering gas containing $CO_2$ in a rotary kiln having an elevated feed end and a discharge end received in hoods, which comprises delivering a carbonate into the kiln at the feed end thereof, introducing fuel and a combustion-supporting gas into the discharge end of the kiln, discharging solids from the kiln, passing combustion-supporting gas in heat-exchange relation to the solids discharged from the kiln while they still are hot, using at least a portion of the heated gas as the combustion-supporting gas introduced with the fuel, withdrawing evolved gases from the hood at the feed end thereof by means of suction, and passing a portion of said withdrawn evolved gases to and maintaining them in the space between the kiln and the hood at the feed end thereof to prevent air being drawn through the hood at the feed end and contaminating the evolved gases being withdrawn.

4. A method of producing and recovering gas containing $CO_2$ in a rotary kiln having its feed end received and freely rotatable in a hood, which comprises delivering a $CO_2$-yielding material into the kiln at the feed end, applying heat to said $CO_2$-yielding material to evolve $CO_2$ therefrom, withdrawing evolved gases from the hood at the feed end of the kiln by means of suction, and passing a portion of the withdrawn evolved gases to and maintaining them in the space between the kiln and the hood at the feed end of the kiln for preventing ingress of air.

5. A method of producing and recovering gas containing $CO_2$ in a rotary kiln having a discharge end and a feed end received and freely rotatable in a hood, which comprises delivering a carbonate into the kiln at the feed end, introducing fuel into the discharge end of the kiln, discharging solids from the discharge end of the kiln, passing combustion-supporting gas in heat exchange relation to the solids discharged from the kiln while they still are hot, introducing said preheated combustion-supported gas into the kiln, withdrawing evolved gas from the hood at the feed end of the kiln by means of suction, and passing a portion of the withdrawn evolved gases to and maintaining them in the space between the kiln and the hood at the feed end of the kiln for preventing ingress of air.

6. Apparatus for the production and recovery of gas containing $CO_2$, which comprises a rotary kiln, a controllable feeder for delivering a carbonate into the kiln at the feed end thereof, a burner for delivering a combustible mixture of fuel and a combustion-supporting gas into the kiln at the discharge end thereof, a controllable fuel feeder, a heat exchanger through which solids discharged from the kiln pass, means for passing combustion-supporting gas through said heat exchanger to receive heat from said solids, means for mixing a portion of the heated gas passing from said heat exchanger with the fuel fed by the fuel feeder and delivering the mixture to the burner, means for passing another portion of the heated gas to the kiln as a source of secondary gas for combustion, means within said heat exchanger for regulating the amount of heat taken up by the primary and secondary combustion gases so that the amount of heat taken up by the primary combustion-supporting gas varies inversely as the amount of heat taken up by the secondary combustion-supporting gas, and a conduit for leading away evolved gases from the kiln at said feed end thereof.

7. Apparatus for the production and recovery of gas containing $CO_2$, which comprises a rotary kiln, a hood at each end of the kiln, the ends of the kiln projecting into and being freely received in said hoods, means for feeding carbonate into the kiln at one end, a conduit for conducting gases from the hood at the feed end of the kiln, suction means connected to said gas conduit for withdrawing evolved gases therefrom, means for passing a portion of said withdrawn evolved gases into the space between the kiln and the hood at the feed end of the kiln, means for maintaining an atmosphere of such gases in said space for preventing ingress of air, and means for introducing a combustible mixture into the kiln at the other end thereof.

8. Apparatus for the production and recovery of gas containing $CO_2$, which comprises a rotary kiln, a hood at each end of the kiln, the ends of the kiln projecting into and being freely received in said hoods, means for feeding raw material into the kiln at one end thereof, suction means for withdrawing evolved gases of the hood at the feed end of the kiln, means for passing a portion of the evolved gases withdrawn from the hood by said suction means into the space between the hood and the kiln at the feed end of the kiln means for maintaining an atmosphere of such gases in said space for preventing ingress of air, a conduit for conducting away solids from the other end of the kiln, a burner discharging into the kiln at said other end, a feeder for supplying fuel to the burner, and blower means for supplying air to be mixed with fuel from said feeder and supplying the mixture to said burner and for supplying additional air for combustion into the kiln adjacent to said burner.

9. Apparatus for the production and recovery of gas containing $CO_2$, which comprises a rotary kiln, a controllable feeder for delivering a carbonate into said kiln at the inlet end thereof, a burner for delivering a combustible mixture into the discharge end of the kiln, a controllable fuel feeder, a cooling chamber for solids discharged from the kiln, means for passing air through the chamber and into the kiln, means for withdrawing air from the chamber, mixing it with fuel fed by the feeder, and delivering the mixture to the burner, a conduit for conducting evolved gases from the kiln at said inlet end thereof, and means receiving evolved gases from said conduit and maintaining said gases in contact with the outer surface of said kiln for preventing ingress of air into said conduit.

10. Apparatus for the production and recovery of gas containing $CO_2$, which comprises a rotary kiln having a lining of heat-resistant material and a lining of insulating material, said insulating lining extending at least throughout the length of the kiln except for the hot zone, said kiln having a section of increased diameter adjacent one end, means for introducing fuel and air into the kiln at said end, means at the other end of the kiln for withdrawing evolved gases from the kiln, said means being controllable for regulating the pressure within the kiln from end to end thereof, and means for passing a portion of said withdrawn evolved gases to said other end of the kiln and maintaining them between the interior of the kiln and the atmosphere for preventing inflow of air into the kiln.

11. Apparatus for producing and recovering gas containing $CO_2$, which comprises a rotary kiln having a hood at each end, the ends of the kiln being freely received in said hoods, means for introducing raw material to be treated into the kiln at one end thereof, means for introducing fuel and air for combustion into the kiln at the other end thereof, said means being controllable, means for withdrawing evolved gases from the kiln at the end into which the raw material is fed, means for passing a portion of said withdrawn evolved gases into the hood at the feed end of the kiln for preventing ingress of air into the kiln at that end except under control, said means including means for maintaining evolved gases between the interior of the kiln and the atmosphere adjacent the end of the kiln into which the raw material is fed, and means for re-circulating a portion of the evolved gases through the kiln to control conditions of combustion therein.

EUGENE A. HULTS.